(12) United States Patent
Finkelshtein et al.

(10) Patent No.: US 11,455,364 B2
(45) Date of Patent: Sep. 27, 2022

(54) CLUSTERING WEB PAGE ADDRESSES FOR WEBSITE ANALYSIS

(71) Applicant: INTERNATIONAL BUSINESS MACHINES CORPORATION, Armonk, NY (US)

(72) Inventors: Andrey Finkelshtein, Beer Sheva (IL); Noga Agmon, Givat Shmuel (IL); Eitan Menahem, Beer Sheva (IL); Yehonatan Bitton, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 16/908,789

(22) Filed: Jun. 23, 2020

(65) Prior Publication Data
US 2021/0397669 A1 Dec. 23, 2021

(51) Int. Cl.
*G06F 16/95* (2019.01)
*G06F 16/955* (2019.01)
(Continued)

(52) U.S. Cl.
CPC ........ *G06F 16/9566* (2019.01); *G06F 16/951* (2019.01); *G06F 21/566* (2013.01); *G06K 9/6223* (2013.01); *G06N 20/00* (2019.01)

(58) Field of Classification Search
CPC .................................................. G06F 16/9566
(Continued)

(56) References Cited

U.S. PATENT DOCUMENTS 6,671,711 B1 * 12/2003 Pirolli ................. G06F 16/9558
709/200
7,043,702 B2 5/2006 Chi
(Continued)

FOREIGN PATENT DOCUMENTS

WO 2003052571 A1 6/2003

OTHER PUBLICATIONS

Chau, et al., "Detecting Fraudulent Personalities in Networks of Online Auctioneers," Proceedings of the 10th European Conference on Principles and Practice of Knowledge Discovery in Databases Berlin, Germany, Springer-Verlag Berlin Heidelberg, http://www.cs.cmu.edu/~dchau/papers/auction_fraud_pkdd06.pdf, Sep. 18-22, 2006, pp. 103-114.

(Continued)

*Primary Examiner* — Syling Yen
(74) *Attorney, Agent, or Firm* — David Spalding

(57) ABSTRACT

A machine learning clustering process is trained. Web pages of a website are clustered. User flow data associated with a first browsing session at the website is obtained. The user flow data includes a plurality of web page identifiers (e.g., URLs). A web page record for each of the web page identifiers is generated. Each web page record includes words of the corresponding web page identifier. Clusters of web page identifiers previously output from the trained machine learning clustering process are received. For each of the web page records, a cluster of web page identifiers is identified by mapping the web page record to one of the clusters of web page identifiers using the machine learning clustering process. A directed graph representative of the first browsing session is constructed. One or more nodes of the directed graph are the identified clusters of web page identifiers.

20 Claims, 7 Drawing Sheets

(51) Int. Cl.
   *G06N 20/00*      (2019.01)
   *G06F 21/56*      (2013.01)
   *G06K 9/62*       (2022.01)
   *G06F 16/951*     (2019.01)

(58) Field of Classification Search
   USPC ........................................................ 707/722
   See application file for complete search history.

(56) References Cited

U.S. PATENT DOCUMENTS

| | | | |
|---|---|---|---|
| 7,680,858 B2 | 3/2010 | Poola | |
| 7,769,682 B2 | 8/2010 | Moudgal | |
| 8,634,297 B2 | 1/2014 | Mishra | |
| 2002/0130907 A1* | 9/2002 | Chi | G06F 16/954 715/853 |
| 2007/0198603 A1* | 8/2007 | Tsioutsiouliklis | G06F 16/951 |
| 2008/0010291 A1* | 1/2008 | Poola | G06K 9/6219 |
| 2008/0275902 A1* | 11/2008 | Burges | G06K 9/6224 |
| 2010/0094768 A1* | 4/2010 | Miltonberger | G06N 5/02 705/325 |
| 2014/0278479 A1 | 9/2014 | Wang | |
| 2015/0161622 A1 | 6/2015 | Hoffmann | |
| 2016/0307201 A1 | 10/2016 | Turgeman | |
| 2018/0210864 A1* | 7/2018 | Zhang | G06F 40/268 |

OTHER PUBLICATIONS

Dalvi, et al., "A Method of Performing Structural Clustering of Web Pages," IP.Com Prior Art Database Technical Disclosure, IP.Com No. IPCOM000206554D, https://priorart.ip.com/IPCOM/000253348, Apr. 29, 2011, pp. 1-6.

Disclosed Anonymously, "Phishing Kits Detection," IP.Com Prior Art Database Technical Disclosure, IP.Com No. IPCOM000253348D, https://priorart.ip.com/IPCOM/000253348, Mar. 23, 2018, pp. 1-4.

Kan, et al, "Fast webpage classification using URL features," ACM 1-59593-140-6/05/0010, https://dl.acm.org/doi/10.1145/1099554.1099649, Nov. 5, 2005, pp. 1-2.

Koppula, et al., "Learning URL Patterns for Webpage De-duplication," ACM 978-1-60558-889-6/10/02, https://dl.acm.org/doi/10.1145/1718487.1718535, Feb. 6, 2010, pp. 1-10.

Le, et al., "URLNet: Learning a URL Representation with Deep Learning for Malicious URL Detection," arXiv:1802.03162v2, https://www.researchgate.net/publication/323118482, Mar. 2, 2018, pp. 1-13.

IBM, List of IBM Patents or Patent Applications Treated as Related, Appendix P, dated Jul. 17, 2020, 2 pages.

Pending U.S. Appl. No. 16/908,785, filed Jun. 23, 2020, entitled: "User Flow Graph Analytics for Cyber Security", pp. 1-32.

* cited by examiner

CLUSTERING WEB PAGE ADDRESSES FOR WEBSITE ANALYSIS

BACKGROUND

Embodiments relate, generally, to website analysis, and more particularly to clustering web pages of a website to map the website application for use in improving fraud detection techniques and for use in other activities.

Many organizations allow clients to access their accounts with the organization through secure websites. This includes, for example, financial institutions such as banks, brokers, and insurers, as well as e-commerce companies or other organizations serving clients.

Such organizations suffer from frequent frauds, causing tremendous damage to the organization and its clients alike. One common type of fraud is known as Account Take-Over (ATO), where a malicious agent gains unauthorized access the online account of a user, such as by compromising the logon credentials of that user. Malicious agents can change account details, make purchases, withdraw funds, and gain sensitive and confidential information of the user, for example.

Organizations employ a variety of cyber security measures to prevent or discover fraudulent activity conducted through their websites. For example, preemptive measures include enforcing strong-password policies, periodic password change policies, two-factor authentication, biometric authentication, etc. To discover frauds in real-time, organizations often rely on 'red flags' such as atypical geographic location of the user (as evident from his or her IP address), atypical behaviometrics (e.g., atypical cursor or keystroke dynamics), or atypical transactions, to name a few examples.

The foregoing examples of the related art and limitations related therewith are intended to be illustrative and not exclusive. Other limitations of the related art will become apparent to those of skill in the art upon a reading of the specification and a study of the figures.

SUMMARY

An embodiment is directed to a computer-implemented method for clustering web pages of a website application. The method includes obtaining user flow data associated with a first browsing session at the website. The user flow data includes a plurality of web page identifiers. The method also includes generating a web page record for each of the web page identifiers. Each web page record includes one or more words of the corresponding web page identifier. In addition, the method includes receiving two or more clusters of web page identifiers. The two or more clusters of web page identifiers may have been output from a trained machine learning clustering process. For each of the web page records, the method includes identifying a cluster of web page identifiers by mapping the web page record to one of the two or more clusters of web page identifiers using the machine learning clustering process. Further, the method may include constructing a first directed graph representative of the first browsing session. The directed edges of the first directed graph are transitions between web pages. One or more nodes of the first directed graph are the identified clusters of web page identifiers.

In various embodiments, the method may include classifying the first browsing session as legitimate or fraudulent using the first directed graph and a machine learning classifier. In an embodiment, the method further include automatically terminating the first browsing session.

In another embodiment, a computer-implemented method for configuring the machine learning clustering process is disclosed. The method may performed prior to the of obtaining user flow data associated with the first browsing session at the website. The method may include obtaining user flow data associated with a plurality of browsing sessions at the website, each instance of the user flow data including a plurality of web page identifiers. Alternatively, the method may include obtaining the web page identifiers of the website. The method also includes generating a plurality of web page records. One for record may be generated for each of the web page identifiers of the plurality of browsing sessions. Each web page record includes one or more words of the corresponding web page identifier. In addition, the method may include calculating a plurality of clusters using a clustering algorithm and at least one initial clustering algorithm parameter if the clustering algorithm contains such parameters. Each web page record of the plurality of web page records is assigned to one of the plurality of clusters. Further, the method may include evaluating the plurality of clusters generated using the at least one initial clustering algorithm parameter based on a performance metric. The method may also include tuning the at least one initial algorithm parameter based on a result of the evaluating and re-calculating the plurality of clusters. The machine learning clustering process uses the tuned at least one initial algorithm parameter value.

In addition to computer-implemented methods, various embodiments are directed to a system and a computer program product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
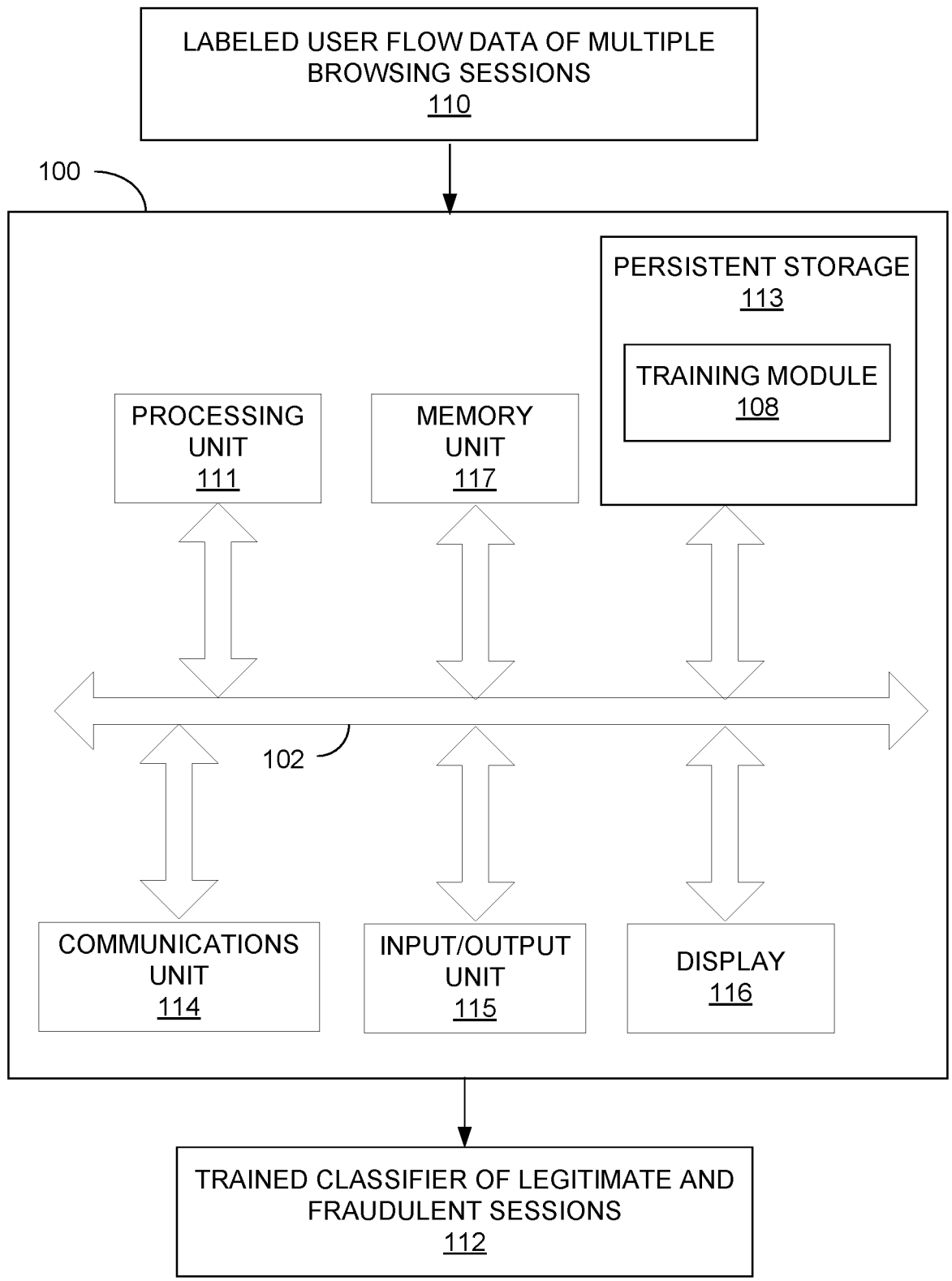
FIG. 1 is a block diagram of an exemplary system for training a machine learning classifier, according to an embodiment.

According to various embodiments, techniques for detection of fraudulent user activity at a website may be improved by a process for clustering web pages of an application. A process for clustering web pages for use in improving a fraud detection technique is disclosed herein. The fraud detection technique and the web page clustering process may be embodied in a system, a method, and a computer program product. A user browsing session at the website is tracked, to obtain user flow data associated with the session. The user flow data is descriptive of the browsing path taken by the user at the website: which pages were visited, in what order, and for what duration. The user flow data includes multiple web page identifiers, such as URLs. A web page record is generated for each of the web page identifiers as part of a machine learning clustering process. Each web page record includes one or more words from the web page identifier. The machine learning clustering process is used to identify a cluster of web page identifiers for each web page record, thereby grouping semantically related web pages. Then, a directed graph representative of the session is constructed from the user flow data. Directed edges of the directed graph are transitions between web pages. One or more nodes of the directed graph are the identified clusters of web page identifiers. A set of features of this directed graph is computed. Finally, a machine learning classifier is applied to the set of features, in order to classify the session as legitimate or fraudulent.

User-flow analysis has proven to be helpful in detecting financial frauds but there are several difficulties with the technology. First, financial website applications may contain hundreds of pages and screens, making the user-flow space especially large and resulting in a multitude of graph nodes. The large number of web pages can result in many possible nodes of a user-flow graph. Since the fraud detection technology may be based on machine learning, the large number of web pages causes a very high dimensionality of the machine learning training data. This can be an issue for a machine learning classification algorithm. In many cases, there are similar pages of web applications that perform similar actions. In such cases, the machine learning classification model will have to train on a large number of different cases to cover all the possibilities. In addition, web applications may update regularly—new pages are added, and existing pages are edited, replaced or removed. This reduces the ability to utilize the acquired user-flow knowledge over time.

These challenges may be overcome with a method that both reduces the overall user-flow space and can easily add new knowledge and keep up with any changes. According to at least one embodiment, each web page of a web application is assigned to a cluster. The cluster represents web pages that are close to each other in the words space, or in other words, a group of web pages that have similar words in their URLs will be assigned to the same cluster. The groups that are created by clustering the web pages define a mapping of the web application. The assumption is that each group that was associated to a cluster represents a part of the application.

Advantageously, the machine learning classifier is trained to differentiate between graph feature values that are typically associated with browsing activity of legitimate users, and graph feature values typically associated with browsing activity of fraudulent users. In particular, the machine learning classifier may be trained with directed graphs of user activity in which nodes are clusters of web pages or a combination of clusters and URLs. This is based on the notion that the way a typical fraudulent user browses a certain website is different, even if minimally, than how a typical legitimate user browses it. The graph features can capture even minute differences, and lead to effective detection of a fraudulent browsing session—optionally in real-time.

The disclosed technique is useful, for example, in the context of financial institution websites which serve as gateways to access client accounts. When the account credentials of a legitimate user are compromised, a fraudulent user may access the account through the website and conduct illegitimate activities—such as wire money out of the account, make online purchases, change account details, or access sensitive information about the client, to name a few examples. The malicious intent of such fraudulent user may be subtly expressed by the way he or she conduct their browsing session, and hence be detectable by the present technique.

Similarly, the present technique may be beneficial for any type of website which maintains user accounts (not "accounts" in the financial sense, but rather personal areas of the website) and requires users to authenticate before accessing their accounts.

Accordingly, the term "website," as used herein, may refer to any type of web application having its front end as a set of HTML (HyperText Markup Language) documents ("pages"), and its back end as one or more databases that store data associated with user accounts—wherein reading and writing of such data is only permitted to authenticated users.

In a more general sense, the technique can be utilized with any computerized system that can track the actions of individual users therein, and provide user flow data descriptive of these actions.

FIG. 1 is a block diagram illustrating a computer system which may be used as a client, server, or host computer according to various embodiments. As shown, a computer system 100 includes a processor unit 111, a memory unit 117, a persistent storage 113, a communications unit 114, an input/output unit 115, a display 116, and a system bus 102. Computer programs are typically stored in the persistent storage 113 until they are needed for execution, at which time the programs are brought into the memory unit 117 so that they can be directly accessed by the processor unit 111. The processor unit 111 selects a part of memory unit 117 to read and/or write by using an address that the processor 111 gives to memory 117 along with a request to read and/or write. Usually, the reading and interpretation of an encoded instruction at an address causes the processor 111 to fetch a subsequent instruction, either at a subsequent address or some other address. The processor unit 111, memory unit 117, persistent storage 113, communications unit 114, input/output unit 115, and display 116 interface with each other through the system bus 101.

The computer system 100 may be used for training a machine learning classifier (hereinafter simply "classifier"), according to an embodiment. A training module 108 may be stored in persistent storage 113. Labeled user flow data of multiple sessions may be input to the system 100. As described below, the training module may use labeled user flow data of multiple sessions to train a classifier 112 of legitimate and fraudulent sessions. In particular, system 100 may operate by loading instructions of training module 108 into RAM. The instructions of training module 108 may cause system 100 to receive labeled user flow data of multiple browsing sessions of multiple users 110, process that data, and output a trained classifier of legitimate and fraudulent sessions 112. In an embodiment, the labeled user flow data of multiple browsing sessions of multiple users 110 may include directed graphs in which one or more nodes of the directed graph are clusters of web page identifiers System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system could run as one or more cloud computing "instances," "containers," and/or "virtual machines," as known in the art.

The instructions of training module 108 are now discussed with reference to the flowchart of FIG. 2, which illustrates a method for training a classifier of legitimate and fraudulent sessions, in accordance with an embodiment.

Figure 2:
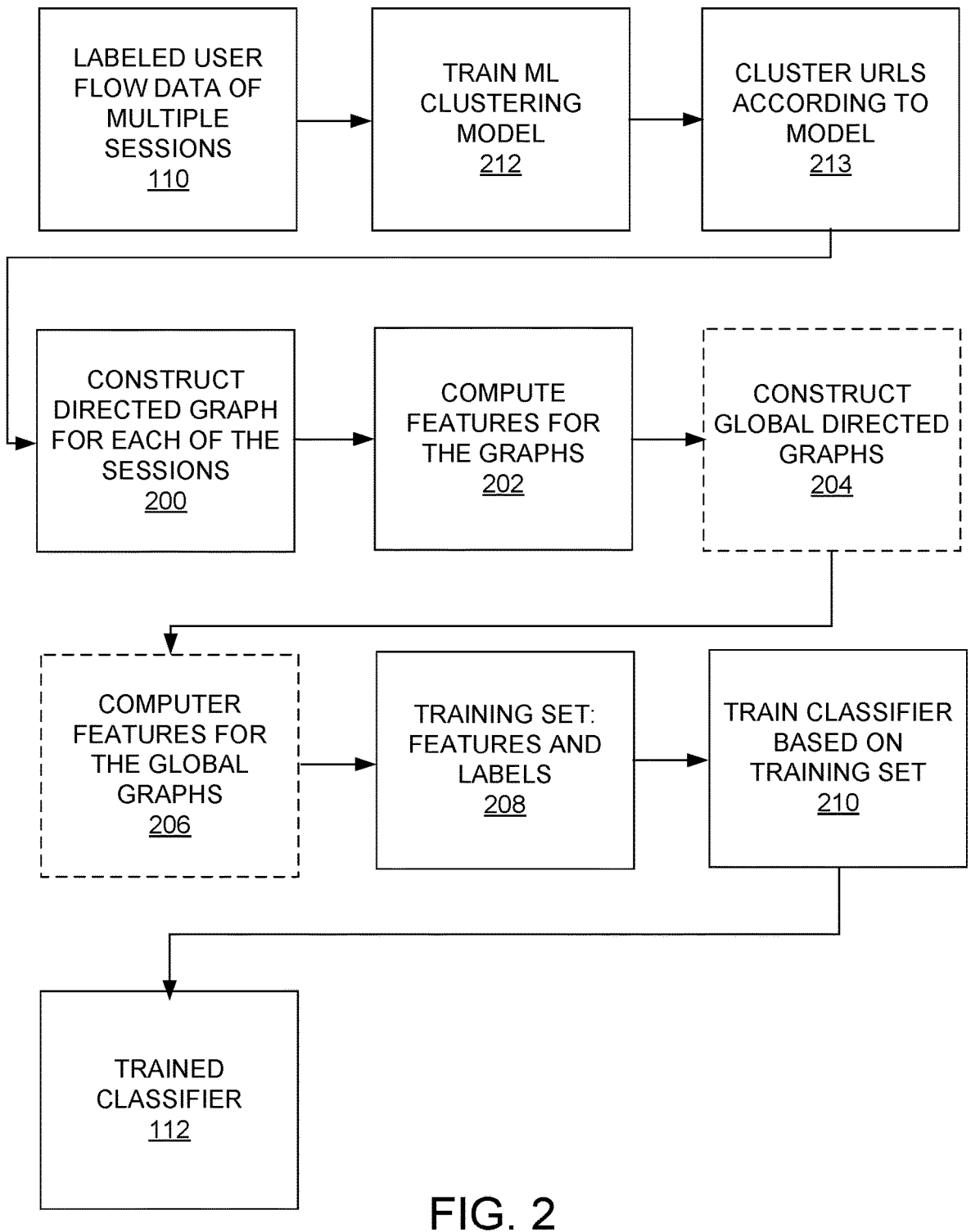
FIG. 2 is a flowchart of a method for training a classifier of legitimate and fraudulent sessions, according to an embodiment.

Steps of the method of FIG. 2 may either be performed in the order they are presented or in a different order (or even in parallel), as long as the order allows for a necessary input to a certain step to be obtained from an output of an earlier step. In addition, the steps of that method are performed automatically (e.g., by system 100 of FIG. 1), unless specifically stated otherwise.

First, labeled user flow data 110 (of FIG. 1) is obtained, for example, by extracting information from one or more log files of an HTTP (HyperText Transfer Protocol) server hosting a particular website, representing that information as user flow data, and labeling each browsing session in these data as legitimate or fraudulent.

User flow data 110 may be associated with a sufficient number of browsing sessions of different users, to form a large enough sample for training the classifier effectively. For example, user flow data 110 may be associated with at least 50, 100, 200, or more sessions labeled as legitimate, and a similar number of sessions labeled as fraudulent. Each session is associated with a single user, and one user may have one or more sessions associated with him or her. The labeling may be performed based on verified information of whether each session was legitimate (i.e., conducted by the real user who authenticated itself at the start of the session) or fraudulent (i.e., conducted by a malicious user who illegitimately authenticated itself as the real user, such as by gaining access to the credentials of the real user).

For each session, the information (e.g., extracted from the log file) may be represented as a series of transitions each structured as the tuple—

{(referrer page URL, target page URL, time on target page)}.

The referrer page URL (Uniform Resource Locator) is the source of each transition and is typically an HTML document including a hyperlink to the target page, or automatically redirecting the user's web browser to the target page. As the user clicks that hyperlink, or as the web browser automatically redirects to the target page, the web browser retrieves the target page and renders it. When the user clicks a hyperlink in the target page (now having the role of a source page), or when another automatic redirect is performed, the web browser retrieves and renders a new target page, and so on. The time spent on the target page (also "time on page," or "TOP") can be calculated as the time between retrieval of the target page and retrieval of a subsequent, new target page.

Consider, for example, the following exemplary user flow data of a particular session of a user at a banking website:

Logon>Logon (5)
Logon>MyAccounts (350)
MyAccounts>ViewTransactions (35)
ViewTransactions>ManageOverdraft (115)

The user spent 5 seconds at the Logon page, then 350 seconds at the MyAccounts page, 35 seconds at the ViewTransactions page, and 115 seconds at the ManageOverdraft page.

The referrer and target pages are not necessarily "pages" in the sense of discrete HTML documents that are retrieved using HTTP GET requests; for example, a page may be defined as an HTTP POST request that transmits certain information to the HTTP server (e.g., submission of a form with details of a requested wire transfer), without the HTTP server transmitting a new HTML document in response. Rather, the HTTP server may just transmit a message that is rendered and displayed to the user inside a previously rendered HTML document. For example, this may be conducted using the known AJAX technique, which enables sending and retrieving data from a server asynchronously, without interfering with the display and behavior of the existing HTML page.

Step 212 receives as input the user flow data 110 associated with a plurality of browsing sessions at the website application. Each instance of the user flow data includes multiple web page identifiers, such as URLs. Step 212 determines clusters for the multiple web page identifiers. Step 212 configures a machine learning clustering process by: generating web page records, one for each of the web page identifiers of the plurality of browsing sessions. Each of the web page records includes one or more words of the corresponding web page identifier. Step 212 calculates a plurality of clusters using a clustering algorithm. In some embodiments, clusters are calculated using at least one initial clustering algorithm parameter. (Clusters may be calculated without a clustering algorithm parameter if the clustering algorithm does not require a parameter.) Each web page record of the plurality of web page records is assigned to one of the plurality of clusters. Step 212 may include evaluating the plurality of clusters generated using the at least one initial clustering algorithm parameter based on a performance metric. In addition, step 212 may include tuning the at least one initial algorithm parameter based on a result of the evaluating. The plurality of clusters may be re-calculated using the tuned at least one initial algorithm parameter value. Step 213 assigns each of the web page identifiers into one of the clusters determined by the trained machine learning (ML) clustering model. In step 200, described below, the clusters of web page identifiers from step 213, rather than the web page identifiers themselves, may be used to construct a directed graph. Steps 212 and 213 are further described with respect to FIG. 6.

Next, in step 200, a directed graph for each of the sessions, which is representative of the respective session, may be constructed:

In some embodiments, to construct the directed graph, pages of the transitions are defined as its vertices, and traversals from referrer pages to target pages are defined as the graph's edges. In other embodiments, in step 200, a directed graph representative of a browsing session is constructed such that one or more nodes (vertices) of the directed graph are the identified clusters of web page identifiers from step 213, and directed edges of the directed graph are transitions between web pages. In embodiments in which nodes of the directed graph may be clusters of web page identifiers, either all of the nodes may be clusters or, in a hybrid embodiment, some nodes are clusters while other nodes are web page identifiers. Construction of a directed graph in which nodes of the directed graph are clusters of web page identifiers is further explained below.

Figure 5A:
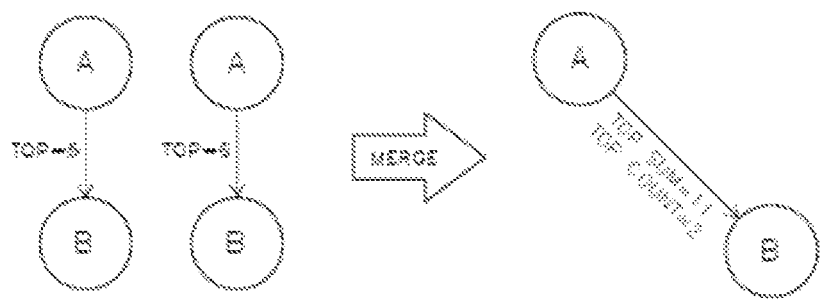
FIG. 5A illustrates exemplary merging of transitions of a directed graph, according to an embodiment.

In a pre-processing stage, those of the transitions whose referrer pages are identical and whose target pages are identical, may be merged. Interim reference is made to FIG. 5A, which shows such exemplary merging. On the left are illustrated: First, a transition from page A to page B with a TOP of 5 seconds (namely, time on page B), represented by two vertices A and B and a directed edge from A to B with an attribute TOP=5. Second, another transition from page A to page B with a TOP of 6 seconds, represented by two vertices A and B and a directed edge from A to B with an attribute TOP=6. These two transitions are merged into two vertices A and B and a directed edge from A to B with the attributes TOP sum=11 and TOP count=2.

Following that pre-processing, the directed graph may be constructed as a weighed graph G=(V, E, W). The vertices (V) of the graph (G) are the union of the referrer pages and the target pages (note that some of the referrer and target pages are actually the same page with different roles assumed in different transitions):

$V_{referrers}:=$ {all pages that were referrers}
$V_{target}:=$ {all pages that were targets}
$V:=V_{referrers} \cup V_{targets}$.

The edges (E) may be defined as follows, with the following attributes:

$$E=\{(u,v,\text{TOP sum},\text{TOP count}) \in \text{Counted Transition}\},$$

where u is the tail vertex and v is the head vertex.

The weight (W) attribute of each of the edges of the graph may be defined as the total time on a page during the session:

$$W(u,v)=\text{TOP sum}.$$

Each of the vertices (V) may have two attributes: a page identifier (such as the page's URL), and list of the TOPs from the incoming neighbors:

$$\forall v \in V, v_{incoming\ TOP}:=[\text{TOP sum from the neighbors of } v].$$

Figure 5B:
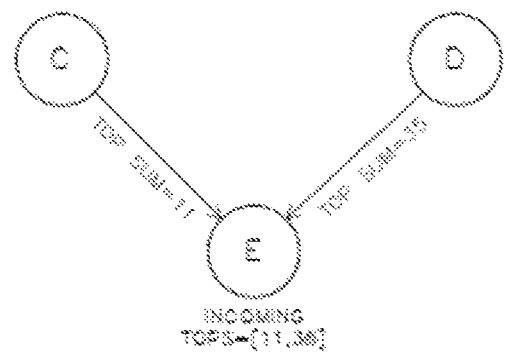
FIG. 5B illustrates an exemplary directed graph, constructed according to an embodiment.

Interim reference is made to FIG. 5B, which shows an exemplary graph with: three vertices C, D, and E; an incoming TOP sum from C to E of 11; and an incoming TOP sum from D to E of 35. Vertex E is therefore attributed with the following list of incoming TOPs from its neighbors: [11, 35].

It should be noted that the construction of the directed graph in step 200 does not have to include any visual rendering of such graph; rather, the directed graph may be constructed textually, using computer-readable syntax suitable for graph representation, as known in the art.

In step 202, a set of features for each of the directed graphs constructed in step 200 may be computed (also "extracted"). These features will later serve in a training set for the classifier.

For example, some or all of the following features may be computed for each of the directed graphs constructed in step 200:

The incoming TOPs attribute of each vertex, as calculated in step 200.

One or more statistical measures of these incoming TOP attributes, computed per page and/or per session, such as: mean/median/maximal/minimal TOP, standard deviation of TOP, and/or any other computable statistical measure of the TOP lists.

A graph connectivity measure, as known in the art.

One or more statistical measures of clusters produced by performing vertex clustering, as known in the art, of the vertices of the graph: Number of clusters, mean/median/maximal/minimal cluster size, standard deviation of cluster size, and/or any other computable statistical measure of the clusters.

One or more vertex centrality measures, as known in the art, of the graph. For example, degree, betweenness, closeness, and/or any other computable centrality measure.

One or more graph features such as its density, clustering coefficient, diameter, transitivity, centrality statistics, as known in the art, and/or any other computable topological characteristic of the graph.

In addition, one or more of the following features of each session may be computed:

Time of day when the logon that initiated the session occurred.

Day of the week when the logon that initiated the session occurred.

Statistics as to different categories (e.g., transactions view, account information, credit cards, wire transfers, savings, securities trading, etc.) to which the pages belong: number of visits to pages of each category, total/mean/median/minimal/maximal TOP for each category, standard deviation of TOP in each category, and/or any other computable statistical measure of the categories.

In step 204, which is optional, global directed graphs may be constructed—one representative of all legitimate sessions, and another representative of all fraudulent sessions. Each of these global directed graphs may be constructed by performing a graph union operation, as known in the art, on all the directed graphs constructed in step 200 (referred to herein, to prevent confusion with the global directed graphs, as "local directed graphs") for the sessions labeled as legitimate or fraudulent, respectively. Accordingly, each of the two global directed graphs essentially combines (e.g., using a mean, a median, a sum, etc.) the values of the attributes of all its respective (legitimate or fraudulent) local directed graphs, as well as combines the weights of the edges.

In step 206, which is optional and accompanies step 204, multiple sets of features may be computed (also "extracted"), each such set characterizing various differences between one of the global directed graphs (legitimate or fraudulent) and each of the local directed graphs which served as the basis for construction of that global directed graph. For example, if there are one hundred local directed graphs associated with legitimate sessions, and one hundred local directed graphs associated with fraudulent sessions, then two hundred sets of features are computed in step 206.

One option to compute these sets of features is to calculate the distance between attribute values of corresponding vertices and edges of each local directed graph and its associated (legitimate or fraudulent) global directed graph. Namely, the values of the attributes of each of the local directed graphs are subtracted from the values of corresponding attributes of the associated global directed graph, and the absolute values of results are saved as the features.

Merely as an example, if an incoming TOP attribute of vertex E in a certain legitimate global directed graph is [6,61], and an incoming TOP attribute of vertex E of a certain local directed legitimate graph is [11,35], then an incoming TOP feature for step 206 is computed as [16-111, 161-351], equaling [5,26]; this feature characterizes the absolute incoming TOP difference between that certain local legitimate directed graph and the certain global legitimate directed graph.

A variant of that option is to compute, in a similar manner to step 202 above, a set of features for each of the global directed graphs, and to then calculate the distance between the values of these features and values of corresponding features in each of the associated (legitimate or fraudulent) local directed graphs. For example, if one of the features computed per step 202 is the vertex centrality measure of "betweenness," then the distance between betweenness values of corresponding vertices in each of the global directed graphs and each of its associated local directed graphs may be used as a feature of step 206.

A second option to compute these sets of features is to calculate the ratio between attribute values of corresponding vertices and edges of each local directed graph and its associated (legitimate or fraudulent) global directed graph. Following the previous example (incoming TOP attribute of [6,61] in a global directed graph, and [11,35] in a local directed graph), an incoming TOP feature is computed as [6/11, 61/35], equaling approximately [0.54, 1.74]; this feature of step 206 characterizes the ratio between the incoming TOP attributes of those certain local legitimate directed graph and global legitimate directed graph.

A variant of the second option, similar to the variant of the first option, is to calculate a ratio between corresponding feature values (computed per the technique of step 202) of each local directed graph and its associated (legitimate or fraudulent) global directed graph.

A third option to compute these sets of features is to calculate a similarity, using metrics such as edit distance, Jaccard index, or the like, between selected vertex and edge groups in each local directed graph and its associated (legitimate or fraudulent) global directed graph. First, the vertices and/or edges of each of the two graphs may be ranked, for example based on the values of their attributes, their weights, and/or any other ranking criteria. Then, a group of the top N (e.g., a number between 3-30) ranking vertices and/or edges from each graph is selected, and the similarity metric (e.g., edit distance, Jaccard index) between the two is calculated.

Features computed according to one or more of the above options may be included in the sets of features of step 206.

As step 202, and optionally also step 206, conclude, they yield a training set 208 which may include a matrix of N sessions over M features, as well as a vector of the size of N with the label (legitimate/fraudulent) of each session. Any other representation of the training set is also possible, as long as it includes that information of the sessions, the computed features, and the labels.

Then, in step 210, a classifier is trained based on training set 208. The classifier may be, for example, logistic regression, naive Bayes, a nearest neighbor classifier, a Support Vector Machine (SVM) classifier, a decision tree classifier, a boosted tree classifier, a random forest classifier, a neural network classifier, or any other type of machine learning classifier. The training of the classifier may be conducted using any conventional method suitable for that type of classifier.

Following the training, trained classifier 112 (of FIG. 1) is provided. That trained classifier is configured, when applied to a browsing session in question, to infer a classification of that session as legitimate or fraudulent.

The training and inference are optionally conducted in association with the same website, for example a website of a specific bank. This way, the classifier is tasked with processing the same type of data (the same underlying pages) as the data it was trained upon.

Alternatively, it is possible to perform the training based not on specific page URLs but rather on more generic page identifiers that are typical to a certain website type. For example, many different banking websites include more or less the same types of pages which are presented to logged-on users, because banks typically allow their clients to perform similar actions online. By creating rules that automatically map a page (e.g., by parsing its contents) to a generic identifier, the training may be generic enough so that the resulting classifier can operate with any other website of the same time (provided that, prior to inference, the user flow data of the browsing session in question is mapped to the same generic identifiers based on the same rules).

Figure 3:
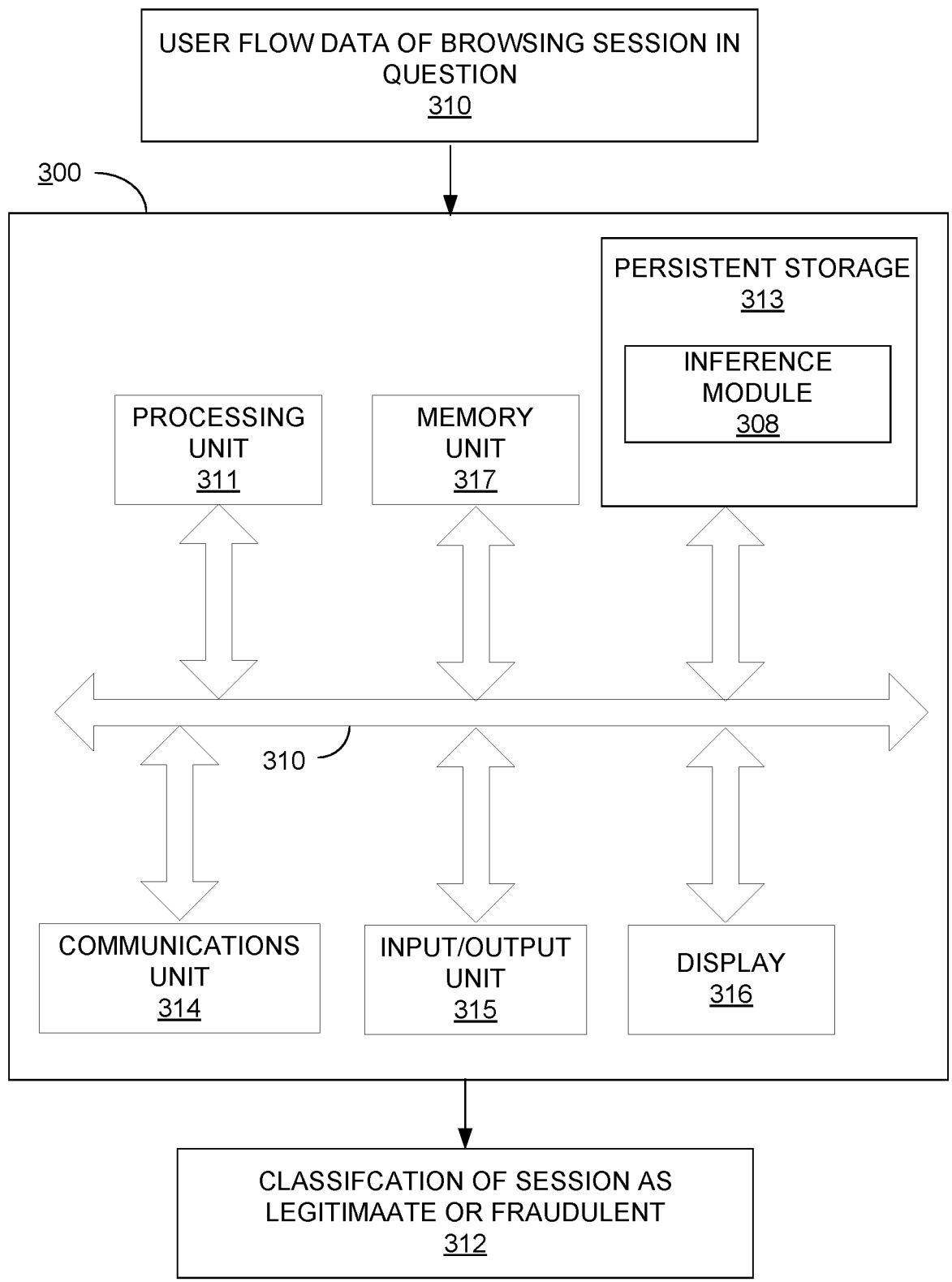
FIG. 3 is a block diagram of an exemplary system for classifying sessions in question as legitimate or fraudulent, according to an embodiment.

Reference is now made to FIG. 3, which shows a block diagram of an exemplary system 300 for classifying sessions in-question as legitimate or fraudulent, according to an embodiment. System 300 may be similar to system 100 of FIG. 1; the description of these components and of the entire system is not repeated here, for reasons of brevity.

That said, system 300 includes an inference module 308 instead of a training module. The instructions of inference module 308 may cause system 300 to receive user flow data of a browsing session in question 310, process that data, and infer a classification 312 of the session in question as legitimate or fraudulent.

The instructions of inference module 308 are now discussed with reference to the flowchart of FIG. 4, which illustrates a method for classifying a session in question as legitimate or fraudulent, in accordance with an embodiment.

Figure 4:
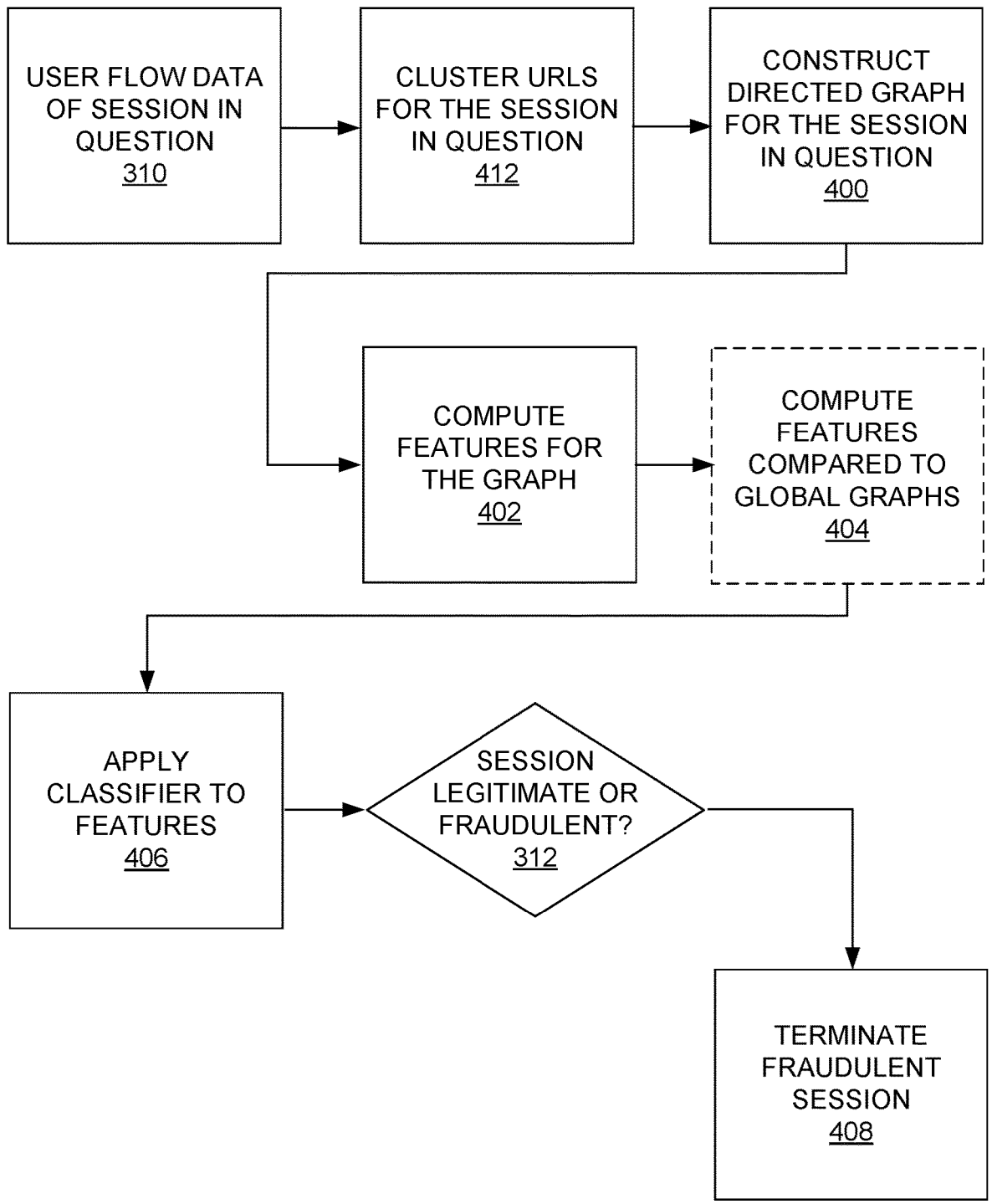
FIG. 4 is a flowchart of a method for classifying a session in-question as legitimate or fraudulent, according to an embodiment.

Steps of the method of FIG. 4 may either be performed in the order they are presented or in a different order (or even in parallel), as long as the order allows for a necessary input to a certain step to be obtained from an output of an earlier step. In addition, the steps of that method are performed automatically (e.g., by system 300 of FIG. 3), unless specifically stated otherwise.

First, user flow data of the browsing session in question 310 (of FIG. 3) is obtained, for example in the same manner described above for obtaining the user flow data for the training.

In step 412, user flow data associated with the browsing session in question, e.g., a first browsing session, at the website is obtained. The user flow data includes multiple web page identifiers. Step 412 includes generating a web page record for each of the web page identifiers. Each web page record may include one or more words of the corresponding web page identifier. In step 412, two or more clusters of web page identifiers may be received. The two or more clusters of web page identifiers may have been output from a machine learning clustering process, such as the trained machine learning clustering model described in step 212. For each of the web page records, a cluster of web page identifiers may be identified. The identification may be performed by mapping the web page record to one of the received two or more clusters of web page identifiers using the machine learning clustering process, e.g., the trained machine learning clustering model. Step 412 is further described with respect to FIG. 7.

In step 400, based on user flow data 310, a directed graph representative of the session in question may be constructed. Its construction may be similar to the way each of the directed graphs were constructed for the training, in step 200 of FIG. 2. In various embodiments, one or more nodes (vertices) of the directed graph in question are the identified clusters of web page identifiers and directed edges of the directed graph in question are transitions between web pages. In some embodiments, all of the nodes of the directed graph may be clusters. In a hybrid embodiment, some nodes are clusters while other nodes are web page identifiers. Construction of a directed graph in which nodes of the directed graph are clusters of web page identifiers is further explained below after a process for clustering web pages is described with reference to FIG. 6.

In step 402, a set of features for the directed graph constructed in step 400 may be computed (also "extracted"). Their computation may be similar to the way the set of features were computed for the directed graphs of the training, in step 202 of FIG. 4.

The set of features computed in step 402 may be represented in a vector of M features, sorted similarly to their order in the training set (or otherwise identified in a manner allowing the classifier to correctly correlate them). However, it is possible to compute less features for the directed graph of the session in question than the number of features the classifier has been trained upon.

Step 404, which is optional, includes computation of a set of features which characterizes differences between the directed graph constructed for the session in question the legitimate global directed graph (of step 204, FIG. 2), and another set of features which characterizes differences between the directed graph constructed for the session in question and the fraudulent global directed graph (of step 204, FIG. 2).

Notably, steps 200 (FIG. 2) and 400 (FIG. 4) may separately use the same underlying technique, mutatis mutandis, to construct their directed graphs; steps 202 (FIG. 2) and 402 (FIG. 4) may separately use the same underlying technique, mutatis mutandis, to compute features for their directed graphs; and steps 206 (FIG. 2) and 404 (FIG. 4) may separately use the same underlying technique, mutatis mutandis, to compute the features characterizing differences between a local directed graph (or the directed graph of the session in question) and a global directed graph.

In step 406, the classifier may be applied to the features computed in step 402 (and optionally also those computed in step 404), in order to infer a classification of the session in question as legitimate or fraudulent 312 (also of FIG. 3). Block 312 may also serve as a decision block, triggering further action if the session in question has been classified as fraudulent. For example, in step 408, a fraudulent browsing session may be terminated to prevent additional damage, and/or be reported to responsible personnel who can take actions to mitigate the fraudulent activity either in real time or after the fact.

To allow termination of fraudulent sessions as in step 408, it may be beneficial to execute the method of FIG. 4 in real-time, for every active session at the website (or only for active sessions flagged as suspicious by some other preliminary algorithm). Every such session may be tracked in real-time as it progresses, so as to periodically update its user flow data, associated directed graph, and computed features—such as every predetermined number of seconds or every predetermined number of transitions (for example, after each and every transition). After each update, the classifier may be applied to the newly computed features. If at any point in time the classifier infers a fraudulent classification, the session may be immediately terminated by interfacing with the HTTP server of the website and causing it to log that user out and optionally to also suspend the affected account. A report to responsible personnel may be concurrently transmitted. The suspension of the affected account may also include causing the HTTP server to display a message to anyone who subsequently tries to logon to it that he or she must contact responsible personnel (e.g., a referee at the bank) in order to verify their identity and possibly issue them with new logon credentials.

Figure 6:
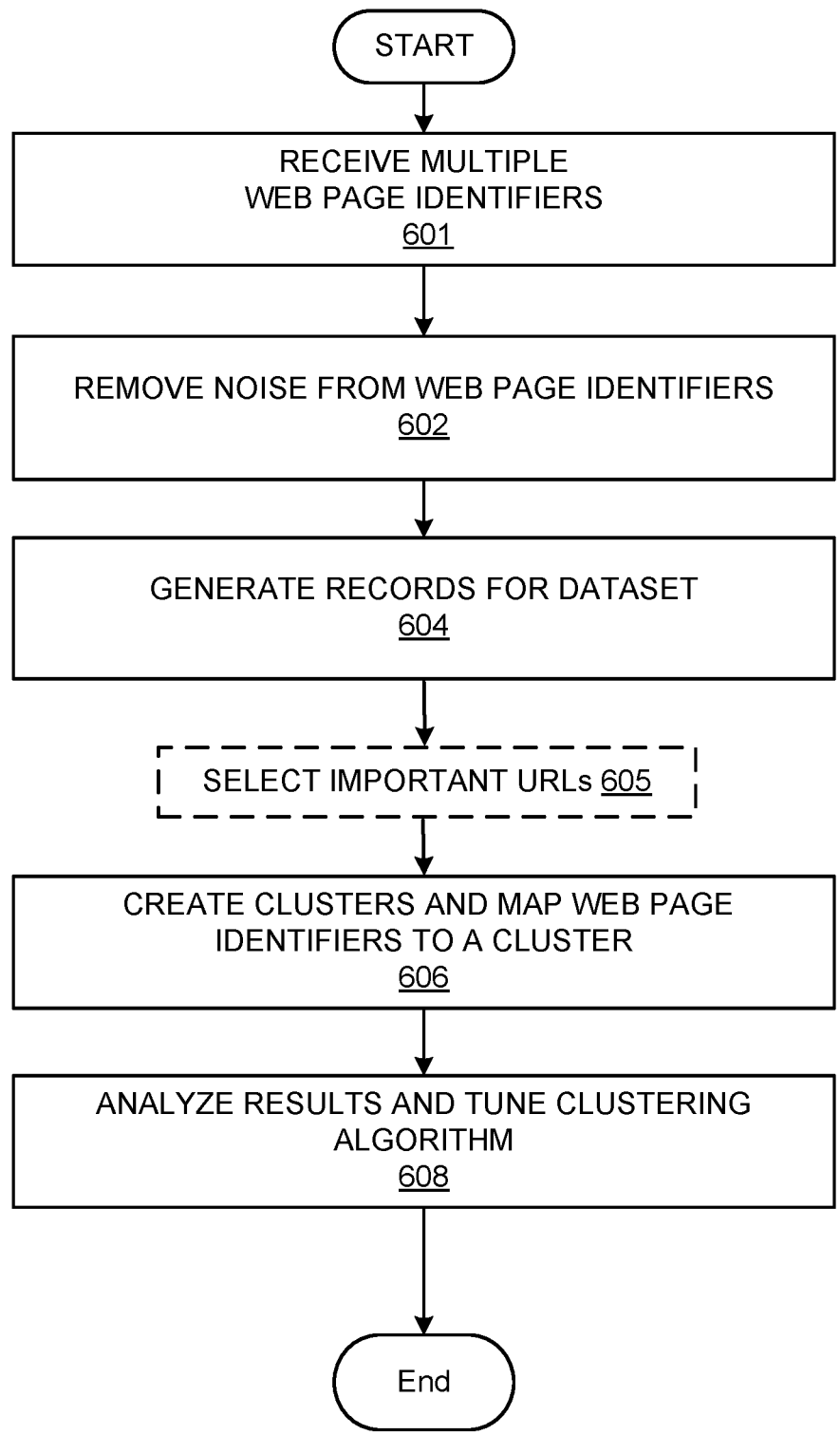
FIG. 6 is a flowchart of training phase of a process for clustering web pages of an application for use in mapping the application and to improve fraud detection algorithms, according to an embodiment.

FIG. 6 is a flowchart of a process for training a machine learning clustering model and clustering web page identifiers using the trained model, according to an embodiment. The process may be used in mapping the application and to improve fraud detection algorithms, according to various embodiments. The clustering may be done by analyzing the URLs associated with the web pages using a Bag of Words (BoW) technique, with the goal of automatically mapping web applications into named clusters by grouping semantically related web pages. Referring to FIG. 6, at 601, multiple web page identifiers of a website are received. Step 601 corresponds with step 212, which includes receiving user flow data associated with one or more browsing sessions. A browsing session typically includes multiple web page identifiers, e.g., URLs. The web page identifiers received at 601 may be from the browsing sessions referred to in step 212. However, it is not required that the web page identifiers received at 601 be from a browsing session. In alternative embodiments, the web page identifier may be received at 601 from any source.

At 602, the web page identifiers may be pre-processed to removing noise. A URL may be parsed to remove extraneous parts ("noise elements"). Examples of extraneous parts include HTTP parameters with numeric values, including hexadecimal representations, and values that are random, hashed, or encrypted. Examples of extraneous parts that may be removed include values that are longer than a pre-defined length or have an entropy value higher than another pre-defined parameter.

At 604, records (or vectors) are generated from the data remaining after pre-processing step 602. Because the records will be added to a dataset, step 604 may correspond with a dataset creation phase. Each web page record may include one or more words of the corresponding web page identifier. The URL may be split into potential text parts ("PTPs") based on URL syntax characters (/, &, =, ?, ., etc.) and these PTPs may be parsed separately. Each PTP may be broken or split into one or more words. This may be accomplished by splitting consecutive alphabetical characters if a non-alphabetical character appears in the PTP (e.g. "gift4you" becomes "gift, you"), and splitting camel case text into separate words (e.g. newOrder becomes "new, order"). Once the PTP is split into words, step 604 may include dropping words that that are longer than a predetermined length or shorter than a predetermined length. Each of the words in the URL may be counted so that the web page record may take the following form {W1: C1, W2: C2, . . . , Wn: Cn}, where Wi is a word that appears in the URL and Ci is the number of times that Wi appeared in the URL. Step 604 may include storing the one or more words that remain after dropping long and short words in a dataset as a web page identifier record. In addition, step 604 may include associating a web page identifier with determined words of the record. Example records of a dataset associating determined words with the web page identifiers "mail-.provider.com" and "freeMail.gifts4free.com" are shown below.

| URL | Provider | Free | Gifts | Mail |
|---|---|---|---|---|
| Mail.provider.com | 1 | 0 | 0 | 1 |
| freeMail.gifts4free.com | 0 | 2 | 1 | 1 |

As can be seen from the above example, the rows of the dataset are the web page identifiers, e.g., URLs of the application and the columns are the words that appear in the URLs. The value of each cell in the dataset is the number of times the word associated to the column appears in the URL associated to the row. The dataset in which the records are stored may be, in various embodiments, an unsupervised dataset. The dataset may be stored in persistent storage 113, 313. The instances of the dataset are web page identifiers, e.g., URLs and the attributes are words. The number of instances in the dataset is the number of distinct URLs in the application and the number of attributes is the number of distinct words that have been extracted from all the URLs.

An additional step not shown in FIG. 6 may be performed after multiple records have been stored in the dataset. In the additional step, words that appear in the dataset in too few of the records and words that are too common may be removed. In particular, words in the dataset with a frequency less than a first parameter and words in the dataset with a frequency greater than a second parameter may be removed. These parameters may be pre-defined as an absolute number or as a percentage of URLs.

In step 606, a model that associates a word representation of a web page identifier, e.g., a URL, with a cluster may be created.

Step 606 includes calculating clusters. All web page identifiers may be clustered in step 606 or, alternatively, if a Hybrid Graph is to be created, not all web page identifiers are clustered in step 606. Accordingly, in some embodiments, the training phase may include an optional step of selecting web page identifiers (URLs) that meet a significance of importance criteria. Prior to clustering, at 605, the model may optionally select and filter out "valuable URLs" that will not be mapped to clusters and that will be used as the URL nodes in the Hybrid User Flow Graph described below. The selection of valuable URLs may be performed by an expert method or a data driven method. In the expert method, a human analyst may manually select the URLs of the pages that are key pages of the application and that fraudsters tend to visit. In the data driven method, any of a combination of heuristics may be defined and used to determine which URLs are important. For instance, an unsupervised heuristic may determine all the URLs that at least K % (a pre-defined parameter) of the instances in a training set visited during the session. Another example may be a supervised heuristic that determines all the URLs that at least K % (a pre-defined parameter) of fraudulent instances in a training set visited during the session. A more sophisticated example may be determining all the URLs where the percentage of fraudulent sessions to visit that URL is higher by at least K (a pre-defined parameter) of the percentage of legitimate sessions to visit that URL.

In one embodiment, step 606 includes calculating a plurality of clusters using a clustering algorithm and at least one initial clustering algorithm parameter if the clustering algorithm contains such parameters. Each web page record of a plurality of web page records that are used to calculate the clusters is assigned to one of the clusters. In an alternative (hybrid) embodiment, each web page record, except records corresponding with a "valuable URL," are assigned to a cluster. For example, the steps 212 and 213 train a machine learning clustering model and assign each of the web page identifiers into one of the determined clusters. Steps 212 and 213 use a clustering algorithm and at least one initial clustering algorithm parameter if the clustering algorithm contains or requires such parameters.

A cluster represents pages that are close to each other in the words space, or in other words, a group of web pages that have similar words in their URLs will be assigned to the same cluster. The groups that are created by clustering the web pages define a mapping of the web application. The assumption is that each group that was associated to a cluster, represents a part of the application. The name of each group is defined by selecting N (a parameter) words that (1) appear in the highest number of URLs of that group and (2) at least one of the selected words appears in each of the URLs in hat group. If there are no words that satisfy condition (2) the process will increase the number of words of that group by one (N=N+1) and try again until the condition is satisfied. The result of this process is a mapping of all the pages of the web application into named groups.

In various embodiments, a clustering algorithm employed in the disclosed embodiments may be any known clustering algorithm, e.g. K-means, DBSCAN, or K-means algorithm variations, such as K-medians. The clustering algorithm parameters depend on the clustering algorithm employed. For a K-means clustering algorithm, the clustering algorithm parameter may be a number of clusters K, a distance metric, a maximal number of iterations and a tolerance parameter. For a DBSCAN algorithm the parameters may include a minimal number of samples in a cluster, radius of the cluster, a distance metric and many other parameters. Some clustering algorithms do not require a parameter.

At 608, results generated in step 606 may be analyzed and the clustering algorithm may be tuned if necessary. In an embodiment, if any clustering algorithm parameters are present, at least one initial algorithm parameter is tuned based on a result of evaluating and re-calculating a plurality of clusters. The machine learning clustering process may use the tuned initial algorithm parameter value. The analysis and tuning may be automatic or manual in various embodiments. Different parameters of the algorithm (and parameters of previous stages) are tested and the parameters where the results are the most satisfying are selected. For example, an automatic tuning for a clustering algorithm can be performed by analyzing silhouette scores of the instances (a known metric of clustering). The silhouette value is a measure of how similar an object is to its own cluster compared to other clusters. The silhouette ranges from −1 to +1, where a high value indicates that the object is well matched to its own cluster and poorly matched to neighboring clusters. If most objects have a high value, then the clustering configuration is appropriate. If many points have a low or negative value, then the clustering configuration may have too many or too few clusters. Alternatively, a manual tuning of the results can be performed by observing the instances of each cluster and changing the parameters of the method to improve the results. For example, if a cluster has URLs that the analyst believes should be mapped into different clusters, a possible tuning of the process is to increase the number of clusters generated by the clustering algorithm. Once the final clusters are defined, the URL groups are named after the most common words that appear in the URLs that are associated with each group. These named groups create a mapping of the web application where the URL groups represent different parts of the application and the name of each group describes what is common about the URLs that are associated to it.

As described above, step 200 includes constructing a directed graph for each of multiple browsing sessions. In addition, as described above, step 400 includes constructing a directed graph for a browsing session in question. In various embodiments, these directed graphs may be constructed such that the nodes of the directed graph are clusters of web page identifiers. In an embodiment, a Clusters User-flow Graph (C-UFG) may be constructed in steps 200, 400. In another embodiment, a Hybrid User-flow Graph (H-UFG) may be constructed in steps 200, 400.

C-UFG is a directed graph in which all of the nodes of the graph are clusters of web page identifiers, e.g., URLs. The C-UFG may be constructed in a similar manner as described in steps 200, 400. However, instead of using URLs as nodes, the clusters to which the URLs are associated may be used as nodes. Each URL may be represented as a bag of words record, i.e. a URL may be represented by the count of each word that appears in the URL, excluding words filtered during the record creation process. The edges may represent transitions of the user from a URL in one cluster to a URL in another cluster and self-loops represent that the user transitioned between URLs in the same cluster.

H-UFG is a graph that is built from two types of nodes—cluster nodes and URL nodes. The URL nodes are the "important" or "valuable URLs" that were determined in step 605 above. All other URLs may be mapped to their clusters in the same manner as creating the C-UFG.

The construction of the H-UFG may use a URL node for every valuable URL that the user has visited during the session and cluster nodes for all the clusters that are associated with other URLs that the user has visited during the session. The edges may represent a transition between valuable URLs, a transition between URL in one cluster to another cluster (or the same cluster), or a transition from a valuable URL to a cluster of non-valuable URLs (or vice-versa).

An H-UFG or C-UFG may have a relatively small number of possible nodes (assuming the number of clusters is much less than the number of web pages). In addition, since similar pages are mapped to a single cluster, many similar flows that would result in different UFGs will result in the same C-UFG or H-UFG. This can help the technology to be more general and learn similar cases with less training samples. The clustering technology can also map new URLs to existing clusters and utilize the knowledge of the model for those pages, unlike the un-clustered UFG model, which will not be able to imply its knowledge to new URLs. Thus, the use of the clustering and the resulting C-UFG or H-UFG may result in user-flow models that are more robust to changes of the application.

In summary, the C-UFG or H-UFG directed graphs may be used to improve user-flow fraud detection algorithms for financial applications. The improvements may include a reduction in the user-flow space and generalization of the model by treating similar pages as a single node (the group's node), a reduction of dimensionality (the dimension depends on the number of groups) and an increase in resiliency to changes in the application due to the fact that new pages can be mapped to existing groups.

Figure 7:
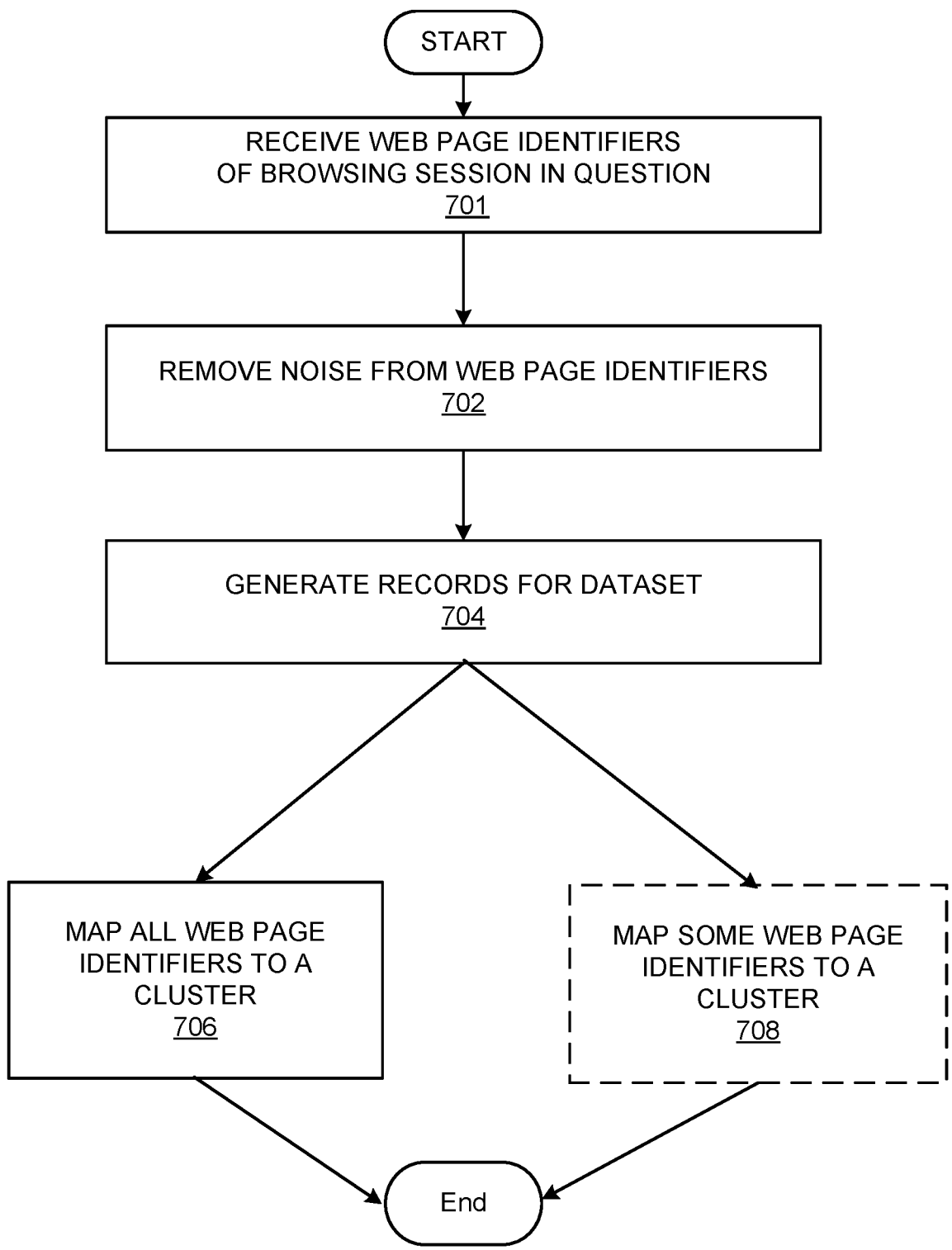
FIG. 7 is a flowchart of a classification phase of a process for clustering web pages of an application for use in mapping the application and to improve fraud detection algorithms, according to an embodiment.

FIG. 7 is a flowchart of a classification phase of a process for clustering web pages of a website application that may be used in mapping the application and to improve fraud detection algorithms, according to various embodiments.

The process of FIG. 7 is similar in some respects to the process of FIG. 6, however, one difference is that at step 701, web page identifiers associated with a single browsing sessions are received. For example, a single browsing session in question may be occurring at substantially the same as the process of FIG. 7 is being performed. Step 701 corresponds with the input from step 310 received at step 412.

At 702, web page identifiers may be pre-processed to remove noise. Step 702 may be similar to or the same as step 602.

At 704, a record (or vector) is generated from the data remaining after pre-processing step 702. Step 704 may be the same as step 604.

Step 706 identifies a cluster of web page identifiers for a web page record. A cluster is identified by mapping the web page record to one of the two or more clusters of web page identifiers. Rather than calculating a plurality of clusters using a machine learning clustering algorithm, the two or more clusters of web page identifiers may have been previously output, for example, from a machine learning clustering process, such as that described in steps 212, 213. Step 706 may correspond with step 412.

Step 708 depicts an alternative to Step 706. Step 708 corresponds with an embodiment in which an H-UFG (hybrid graph) that is built from two types of nodes—cluster nodes and URL nodes. The "valuable URLs" selected in step 605 are used as the URL nodes of the H-UFG.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for clustering web pages of a website application, the method comprising:
    obtaining user flow data associated with a first browsing session at the website, the user flow data including a plurality of web page identifiers;
    generating a web page record for each of the web page identifiers, each web page record including one or more words of the corresponding web page identifier;
    receiving two or more clusters of web page identifiers, wherein the two or more clusters of web page identifiers were output from a machine learning clustering process;
    for each of the web page records, identifying a cluster of web page identifiers by mapping the web page record to one of the two or more clusters of web page identifiers using the machine learning clustering process;
    for each of the web page records, identifying one or more valuable web page identifiers, wherein the valuable web page identifiers are not sent to the machine learning clustering process and are not included in any cluster of web page identifiers; and
    constructing a first directed graph representative of the first browsing session, wherein directed edges of the first directed graph are transitions between web pages and one or more nodes of the first directed graph include the identified clusters of web page identifiers and the valuable web page identifiers.

2. The computer-implemented method of claim 1, further comprising, prior to the receiving two or more clusters of web page identifiers, configuring the machine learning clustering process by:
- obtaining general user flow data associated with a plurality of browsing sessions at the website, each instance of the general user flow data including the plurality of web page identifiers;
- generating a plurality of web page records, one for each of the web page identifiers of the plurality of browsing sessions, each web page record including the one or more words of the corresponding web page identifier;
- calculating a plurality of clusters using a clustering algorithm and at least one initial clustering algorithm parameter, wherein each web page record of the plurality of web page records is assigned to one the plurality of clusters;
- evaluating the plurality of clusters generated using the at least one initial clustering algorithm parameter based on a performance metric; and
- tuning the at least one initial algorithm parameter based on a result of the evaluating and re-calculating the plurality of clusters, wherein the machine learning clustering process uses a tuned at least one initial algorithm parameter value.

3. The computer-implemented method of claim 2, wherein the clustering algorithm is a K-means clustering algorithm.

4. The computer-implemented method of claim 2, wherein each of the web page identifiers are URLs (Uniform Resource Locators).

5. The computer-implemented method of claim 4, wherein the generating a plurality of web page records, one for each of the web page identifiers of the plurality of browsing sessions, each web page record including the one or more words of the corresponding web page identifier further comprises:
- generating pre-processed URLs by removing noise elements from each of the URLs, wherein the noise elements include elements that are numeric, random, hashed or encrypted, or elements that are longer that a first predetermined length with an entropy higher than a predetermined entropy parameter.

6. The computer-implemented method of claim 4, wherein the generating a plurality of web page records, one for each of the web page identifiers of the plurality of browsing sessions, each web page record including the one or more words of the corresponding web page identifier further comprises:
- splitting each URL into one or more potential text parts;
- splitting each potential text part into the one or more words;
- removing words from the one or more words that are longer that a second predetermined length or shorter than a third predetermined length;
- storing the one or more words that remain in the record; and
- associating a web page identifier with the record.

7. The computer-implemented method of claim 1, wherein all of the nodes of the first directed graph are the identified clusters of web page identifiers.

8. The computer-implemented method of claim 1, further comprising:
- classifying the first browsing session as legitimate or fraudulent using the first directed graph and a machine learning classifier.

9. The computer-implemented method of claim 8, further comprising, responsive to classifying of the first browsing session as fraudulent:
- automatically terminating the first browsing session.

10. A computer system for improving fraud detection algorithms through clustering of web page URLs comprising:
- one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
  - obtaining user flow data associated with a first browsing session at the website, the user flow data including a plurality of web page identifiers;
  - generating a web page record for each of the web page identifiers, each web page record including one or more words of the corresponding web page identifier;
  - receiving two or more clusters of web page identifiers, wherein the two or more clusters of web page identifiers were output from a machine learning clustering process;
  - for each of the web page records, identifying a cluster of web page identifiers by mapping the web page record to one of the two or more clusters of web page identifiers using the machine learning clustering process;
  - for each of the web page records, identifying one or more valuable web page identifiers, wherein the valuable web page identifiers are not sent to the machine learning clustering process and are not included in any cluster of web page identifiers; and
  - constructing a first directed graph representative of the first browsing session, wherein directed edges of the first directed graph are transitions between web pages and one or more nodes of the first directed graph include the identified clusters of web page identifiers and the valuable web page identifiers.

11. The computer system of claim 10, further comprising:
prior to the receiving two or more clusters of web page identifiers, configuring the machine learning clustering process by:
- obtaining general user flow data associated with a plurality of browsing sessions at the website, each instance of the general user flow data including the plurality of web page identifiers;
- generating a plurality of web page records, one for each of the web page identifiers of the plurality of browsing sessions, each web page record including the one or more words of the corresponding web page identifier;
- calculating a plurality of clusters using a clustering algorithm and at least one initial clustering algorithm parameter, wherein each web page record of the plurality of web page records is assigned to one the plurality of clusters;
- evaluating the plurality of clusters generated using the at least one initial clustering algorithm parameter based on a performance metric; and
- tuning the at least one initial algorithm parameter based on a result of the evaluating and re-calculating the plurality of clusters, wherein the machine learning clustering process uses a tuned at least one initial algorithm parameter value.

12. The computer system of claim 11, wherein the clustering algorithm is a K-means clustering algorithm.

13. The computer system of claim 11, wherein each of the web page identifiers are URLs (Uniform Resource Locators).

14. The computer system of claim 13, wherein the generating a plurality of web page records, one for each of the web page identifiers of the plurality of browsing sessions, each web page record including the one or more words of the corresponding web page identifier further comprises:
   generating pre-processed URLs by removing noise elements from each of the URLs, wherein the noise elements include elements that are numeric, random, hashed or encrypted, or elements that are longer that a first predetermined length with an entropy higher than a predetermined entropy parameter.

15. The computer system of claim 13, wherein the generating a plurality of web page records, one for each of the web page identifiers of the plurality of browsing sessions, each web page record including the one or more words of the corresponding web page identifier further comprises:
   splitting each URL into one or more potential text parts;
   splitting each potential text part into the one or more words;
   removing words from the one or more words that are longer that a second predetermined length or shorter than a third predetermined length;
   storing the one or more words that remain in the record; and
   associating a web page identifier with the record.

16. A computer program product for improving fraud detection algorithms through clustering of web page URLs comprising:
   a computer-readable storage device storing computer-readable program code embodied therewith, the computer-readable program code comprising program code executable by a computer to perform a method comprising:
      obtaining user flow data associated with a first browsing session at the website, the user flow data including a plurality of web page identifiers;
      generating a web page record for each of the web page identifiers, each web page record including one or more words of the corresponding web page identifier;
      receiving two or more clusters of web page identifiers, wherein the two or more clusters of web page identifiers were output from a machine learning clustering process;
      for each of the web page records, identifying a cluster of web page identifiers by mapping the web page record to one of the two or more clusters of web page identifiers using the machine learning clustering process;
      for each of the web page records, identifying one or more valuable web page identifiers, wherein the valuable web page identifiers are not sent to the machine learning clustering process and are not included in any cluster of web page identifiers; and
      constructing a first directed graph representative of the first browsing session, wherein directed edges of the first directed graph are transitions between web pages and one or more nodes of the first directed graph include the identified clusters of web page identifiers and the valuable web page identifiers.

17. The computer program product of claim 16, further comprising:
   prior to the receiving two or more clusters of web page identifiers, configuring the machine learning clustering process by:
      obtaining general user flow data associated with a plurality of browsing sessions at the website, each instance of the general user flow data including the plurality of web page identifiers;
      generating a plurality of web page records, one for each of the web page identifiers of the plurality of browsing sessions, each web page record including the one or more words of the corresponding web page identifier;
      calculating a plurality of clusters using a clustering algorithm and at least one initial clustering algorithm parameter, wherein each web page record of the plurality of web page records is assigned to one the plurality of clusters;
      evaluating the plurality of clusters generated using the at least one initial clustering algorithm parameter based on a performance metric; and
      tuning the at least one initial algorithm parameter based on a result of the evaluating and re-calculating the plurality of clusters, wherein the machine learning clustering process uses a tuned at least one initial algorithm parameter value.

18. The computer program product of claim 17, wherein the clustering algorithm is a K-means clustering algorithm.

19. The computer program product of claim 17, wherein the generating a plurality of web page records, one for each of the web page identifiers of the plurality of browsing sessions, each web page record including the one or more words of the corresponding web page identifier further comprises:
   generating pre-processed URLs by removing noise elements from each of the URLs, wherein the noise elements include elements that are numeric, random, hashed or encrypted, or elements that are longer that a first predetermined length with an entropy higher than a predetermined entropy parameter.

20. The computer program product of claim 17, wherein the generating a plurality of web page records, one for each of the web page identifiers of the plurality of browsing sessions, each web page record including the one or more words of the corresponding web page identifier further comprises:
   splitting each URL into one or more potential text parts;
   splitting each potential text part into the one or more words;
   removing words from the one or more words that are longer that a second predetermined length or shorter than a third predetermined length;
   storing the one or more words that remain in the record; and
   associating a web page identifier with the record.

* * * * *